United States Patent [19]

Lee

[11] Patent Number: 5,128,813
[45] Date of Patent: Jul. 7, 1992

[54] THERMAL COMPENSATED HEAD POSITIONER SERVO FOR DISK DRIVE

[75] Inventor: Tom L. Lee, San Jose, Calif.

[73] Assignee: Quantum Corporation, Milpitas, Calif.

[21] Appl. No.: 541,838

[22] Filed: Jun. 21, 1990

[51] Int. Cl.$^5$ .............................................. G11B 5/55
[52] U.S. Cl. .............................. 360/78.07; 360/78.06; 318/561
[58] Field of Search ............................ 360/78.07, 78.06; 369/44.25; 318/561, 632

[56] References Cited

U.S. PATENT DOCUMENTS

| | | | |
|---|---|---|---|
| 3,699,555 | 10/1972 | DuVall | 360/78.06 |
| 3,753,254 | 8/1973 | Ruble et al. | 360/77.02 |
| 4,136,365 | 1/1979 | Chick et al. | 360/78.05 |
| 4,207,601 | 6/1980 | Desai et al. | 360/78.05 |
| 4,591,933 | 5/1986 | Quackenbush | 360/78.07 |
| 4,731,680 | 3/1988 | Moriyama et al. | 360/78.13 |
| 4,835,633 | 5/1989 | Edel et al. | 360/78.12 |
| 4,899,234 | 2/1990 | Genheimer | 360/78.07 X |
| 4,982,298 | 1/1991 | Volz et al. | 360/78.06 |
| 5,005,089 | 4/1991 | Thanos et al. | 360/77.08 |

Primary Examiner—Aristotelis Psitos
Assistant Examiner—David L. Robertson
Attorney, Agent, or Firm—David B. Harrison

[57] ABSTRACT

Thermal compensation is provided to a seek mode servo loop of a disk drive having a head and disk assembly including a spindle motor for rotating at least one data storage disk and an electromechanical actuator structure for positioning a data transducer head relative to concentric data tracks defined on a data surface of the data storage disk. This method comprises the steps of:

sensing temperature of the head and disk assembly dynamically during operation of the disk drive, calculating a multiplication factor as a function of sensed temperature, multiplying the multiplication factor by a reference velocity command during a track seek operation to provide a velocity command, comparing the velocity command with a fed back velocity value to generate a velocity error signal, and applying the velocity error signal to an actuator driver to control operation of the actuator structure during the track seek operation.

15 Claims, 5 Drawing Sheets

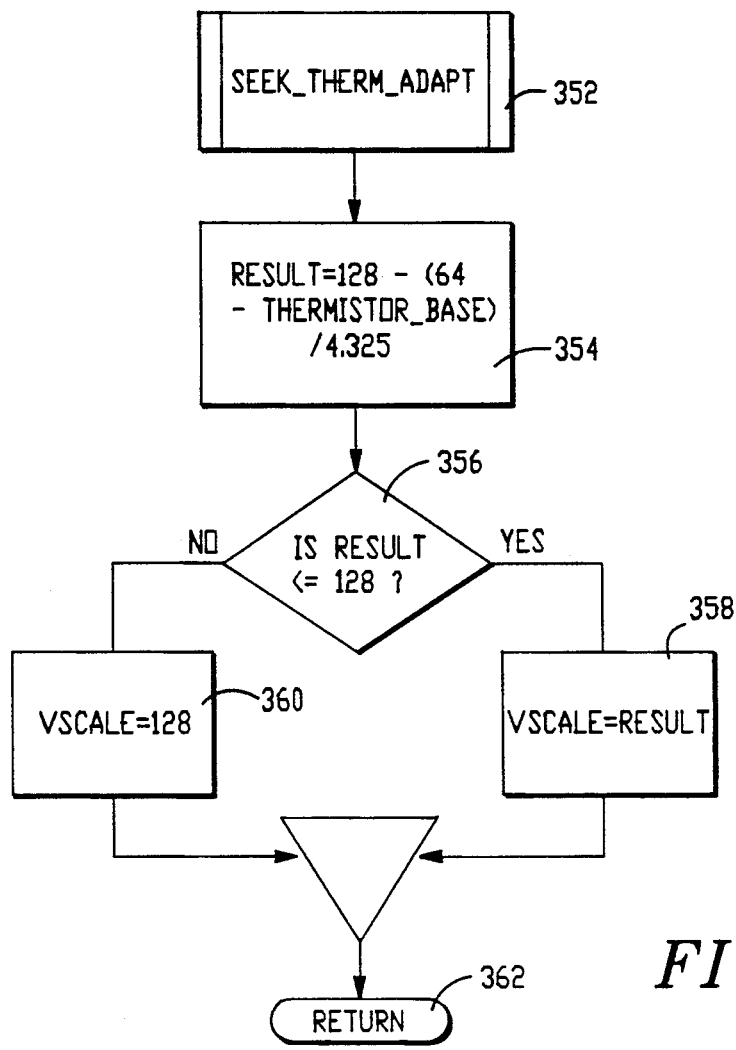
*FIG.—6A*
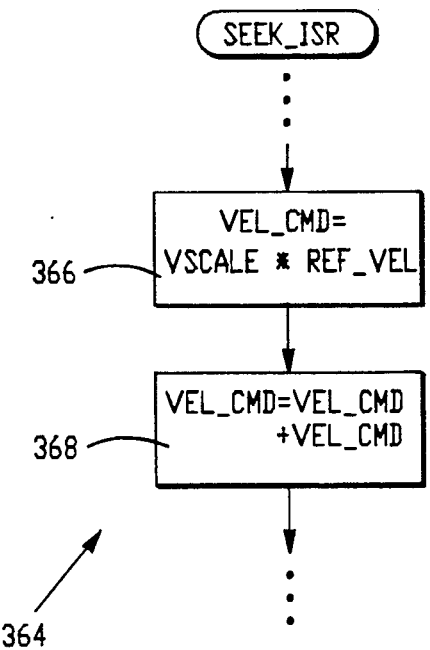
*FIG.—6B*

THERMAL COMPENSATED HEAD POSITIONER SERVO FOR DISK DRIVE

FIELD OF THE INVENTION

The present invention relates to head positioner servo system methods for controlling data transducer head positioning within a disk drive data storage subsystem. More particularly, the present invention relates to a method for providing thermal compensation for a head positioner servo system within a disk drive.

BACKGROUND OF THE INVENTION

Data transducer head positioners employ both open and closed servo loop technologies in order to move the data transducer head among concentric data storage tracks of a rotating storage disk coated with magnetic storage media during track seeking operations, and to keep the data transducer head aligned with each selected data track during track following operations when data is being read from or written to the data track being followed. The head positioner structure includes an actuator for translating electrical driving currents into motion to move the head back and forth in a general radial direction across the data storage surface, and to maintain the head in each selected track following position. A driving amplifier converts position error signals into the driving currents which flow through the actuator coil. The position error signal may be developed by servo feedback information provided from a dedicated servo surface of the disk, or it may be provided on a sampled and held basis from servo sectors recorded in interleave fashion with data sectors in one or more of the concentric data tracks, or it may be derived from an external transducer, such as a polyphase optical transducer coupled to the actuator structure.

It is known within disk drives to sense temperature as a direct measure of changed environmental conditions and provide an error value based on sensed temperature to correct for such temperature changes. See, for example, U.S. Pat. Nos. 3,753,254 and 4,207,601, which describe the use of temperature sensors, such as thermistors, to provide a mechanism for correcting errors in head position as sensed by an actuator position sensing mechanism due to thermal variations.

U.S. Pat. No. 4,136,365 describes a disk drive employing reference tracks and a timer which causes the head positioner servo loop to seek to and read servo correction values from the reference tracks during interruptions in read and write operations in order to recalibrate a position transducer coupled to the actuator. An inductive position sensor is described as preferred. The timer interval is established as a function of the resultant error value derived from reading the reference tracks: the greater the error, the more frequently will check cycles be carried out. This method provides some indirect measure of the rate of thermal changes within the disk drive.

Commonly assigned U.S. Pat. application Ser. No. 07/192,353, filed on May 10, 1988, now U.S. Pat. No. 5,005,089, describes a fixed disk drive servo system including a mass balanced rotary voice coil actuator, a polyphase optical encoder tightly coupled to the actuator, position correction information sampled from each data surface and held for thermal correction, and a temperature sensor for sensing temperature changes within the disk drive thereby to indicate the need for execution of a recalibration operation as temperature shifts are detected. The disclosure of this prior application is hereby incorporated herein by reference thereto.

The performance of the servo loop positioner is dependent upon temperature. As noted above, the typical head transducer positioner includes an actuator coil, printed circuit traces or wires leading from a driver amplifier to the coil, and a sense resistance in series therewith, across which current flow is sensed. The total resistance seen by the actuator power amplifier driver is the sum of the lead resistance, sense resistor resistance and actuator voice coil resistance. This total resistance increases as the temperature increases.

Without thermal feedback compensation, the servo system must be designed for worst case temperature in order to have proper performance and settling characteristics at the worst case (slowest) condition. Therefore, servo performance is limited to and bounded by the worst case temperature specification. However, most of the time, the servo system is operating at a normal ambient temperature condition, such as 30 to 40 degrees C. The servo design margin necessarily included for worst case performance has not heretofore been reduced for normal and low temperature environments. Also, the operating temperature range specification has been compromised without thermal feedback compensation in order to meet seek error rate requirements.

Thus, a hitherto unsolved need has arisen for a servo system for a disk drive which provides direct thermal feedback thereby enabling performance compensation tailored to the instant ambient temperature.

SUMMARY OF THE INVENTION WITH OBJECTS

A general object of the present invention is to provide improved head positioner performance across a temperature range by adjusting head positioner servo loop characteristics as a function of directly sensed temperature at the vicinity of the head positioner voice coil in a manner which overcomes limitations and drawbacks of the prior art.

A more specific object of the present invention is to provide a head positioner servo loop with more optimized track access times at normal operating temperature, while remaining fully functional at higher ambient temperatures.

Yet another specific object of the present invention is to provide a head positioner servo loop which senses and adapts to high ambient operating temperatures, limited only by maximum temperature tolerances of components comprising the servo loop system.

In accordance with the principles of the present invention, a method provides thermal compensation to a seek mode servo loop of a disk drive having a head and disk assembly including a spindle motor for rotating at least one data storage disk and an electromechanical actuator structure for positioning a data transducer head relative to concentric data tracks defined on a data surface of the data storage disk. This new method comprises the steps of:

sensing temperature of the head and disk assembly dynamically during operation of the disk drive, calculating a multiplication factor as a function of sensed temperature, multiplying the multiplication factor by a reference velocity command during a track seek operation to provide a velocity command, comparing the velocity command with a fed back velocity value to generate a velocity error signal, and applying the velocity error signal to an actuator driver to control operation of the actuator structure during the track seek operation.

In one aspect of the present invention, the method includes the further step of correcting sensed low temperatures by limiting them to be no lower than a nominal reference temperature, such as 20 to 30 degrees C., as expected to be sensed at an ambient environment temperature.

In another aspect of the present invention, the step of sensing temperature of the head and disk assembly dynamically during operation of the disk drive comprises the step of sensing temperature with a thermistor mounted for thermal conduction directly to the head and disk assembly.

In one more aspect of the present invention, the step of sensing temperature of the head and disk assembly dynamically during operation of the disk drive further includes the steps of converting an analog electrical signal put out from the thermistor into a digital temperature value, storing the digital temperature value in a memory storage location, retrieving the digital temperature value from the memory storage location and multiplying the retrieved value by a scaling factor in order to provide the multiplication factor.

In one further aspect of the present invention, the dynamic range of the step of converting the electrical signal into a digital temperature value is 256 and the scaling factor equals (1/256) *(256−(128−digital temperature value)/4.75).

These and other objects, aspects, advantages and features of the present invention will be more fully understood and appreciated upon consideration of the following detailed description of a preferred embodiment, presented in conjunction with the accompanying drawings.

BRIEF DESCRIPTION OF THE DRAWINGS In the Drawings.

Figure 1:
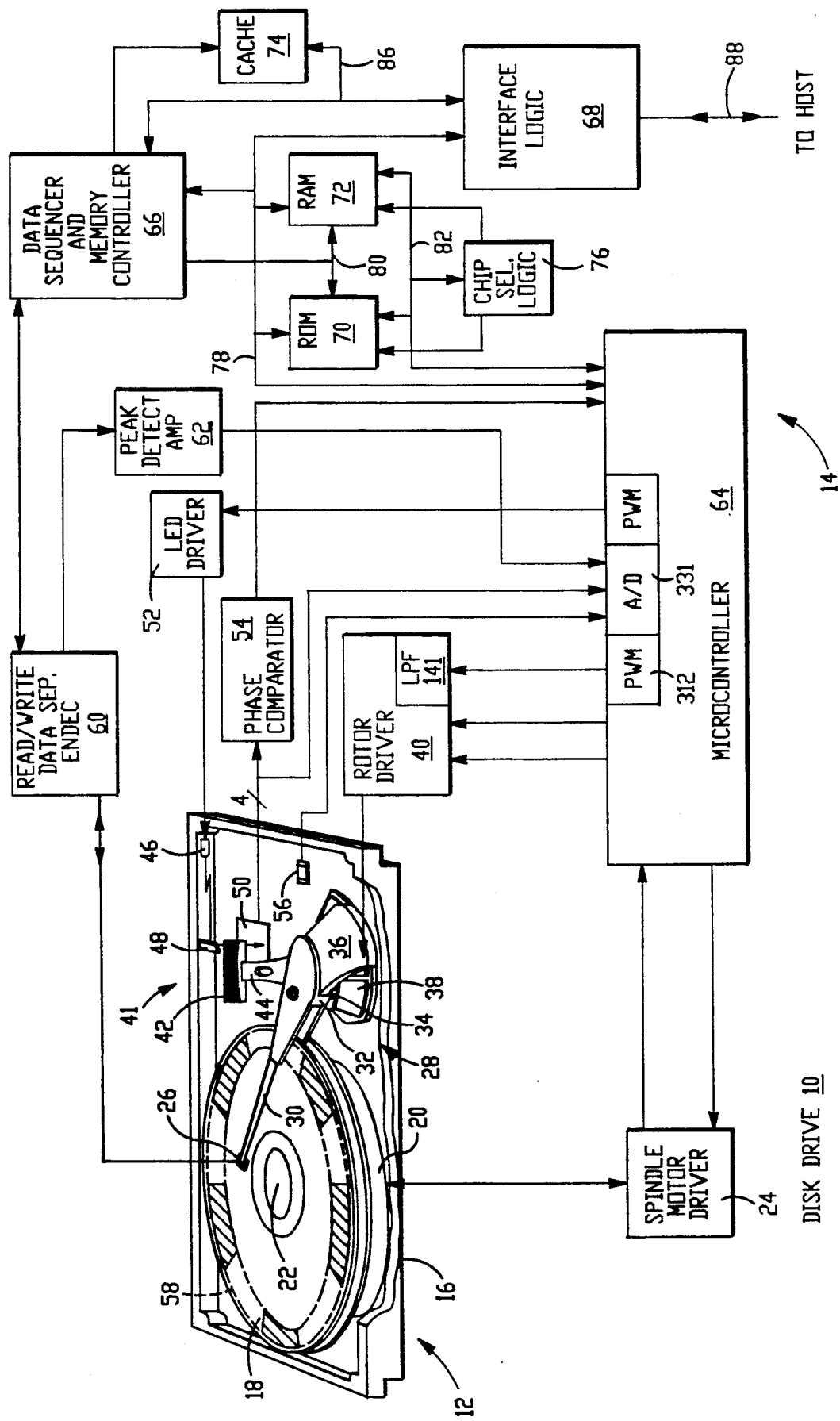
FIG. 1 is a block diagram of a disk drive having a head positioner servo loop including thermal compensation in accordance with the principles of the present invention.

FIG. 6A is a flowchart illustrative of operation of software implementing the principles of the present invention, as a background or housekeeping routine; and FIG. 6B is a partial flowchart illustrative of operation of software implementing the principles of the present invention during a seek mode interrupt service routine executed in real time during a servo supervision phase of microcontroller operation.

DETAILED DESCRIPTION OF A PREFERRED EMBODIMENT

In order to understand the principles of the present invention, a brief description of a fixed disk drive 10 ensues. The disk drive 10 includes an electromechanical head and disk assembly 12 and related electronics circuitry 14.

The head and disk assembly 12 typically includes a frame or base 16 which aligns and supports the other electromechanical elements forming the head and disk assembly 12. Also, the base 16, typically formed as an injection-molded aluminum alloy casting, provides a primary radiator for radiating heat generated from the electrical components of the head and disk assembly. The base 16 may be formed in two parts, or a cover, not shown, is provided in order to provide a hermetically sealed environment, and in some implementations to increase the mechanical strength and rigidity of the base.

One or more data storage disks 18 of predetermined diameter, typically 95 mm or smaller, are mounted to the base 16, typically through a journal provided within a direct drive, brushless DC spindle motor 20 which is mounted directly to the base. The spindle motor 20 rotates the disk 18 at a predetermined angular velocity, such as 3600 RPM in a known direction. The spindle motor 20 includes a fixed stator coil and a moving magnet assembly attached to a rotatable spindle 22 to which the disk 18 is secured. Commutation sensors within the motor 20 are used to generate commutation or switching signals which enable driving currents to be generated by a spindle motor driver circuit 24 in order to rotate the disk 18. Since the spindle motor 20 is directly mounted to the base 16, heat generated in the spindle motor 20 is conducted into the base casting and ultimately dissipated by convection to the ambient environment.

Each major surface of the disk 18 is coated with a magnetic data storage media, typically a thin film media. A multiplicity of concentric data tracks are defined on each storage surface of the disk 18. A data transducer head 26 is provided for each data storage surface, and it is moved to each selected data track by a mass balanced rotary actuator structure 28.

The rotary actuator structure includes a load beam 30 for providing the data transducer head 26 with a preload force toward the data surface which is overcome as the disk is rotated and thereby forms an air bearing holding the head 26 closely above the data surface. A rotary head arm structure 32 is journalled to the base 16 at a post 34, and the structure 32 provides a secure mounting for the load beams 30.

A rotor coil 36 is integrally formed with the structure 32 and is disposed for limited angular displacement within a magnetic field gap formed by two pairs of permanent magnets, only the bottom magnet pair 38 being shown in FIG. 1 in order to aid clarity. Each magnet pair is mounted to a magnetic flux return plate which serves as a mounting plate for the magnets and which also serves as a return path in order to complete the magnetic circuit.

As current from a rotor driver circuit 40 is passed through the coil 36, the coil 36 generates a torque which moves the actuator structure 28 in one direction of rotation, or another, depending upon the direction of current flow through the coil 36. Current flow through the rotary actuator coil 36 provides a second significant source of heat buildup in the head and disk assembly 12. This heat is passed by conduction through the mounting post 34 to the base 16, and it also passes by convection to the adjacent magnet pairs and ultimately to the base 16 by conduction of the intermediate structural components, such as the magnet pairs and flux return plates.

In this particular disk drive 10, a polyphase actuator-position optical encoder 41 is provided. In this regard, the actuator structure 28 further includes a glass scale 42 secured to a scale arm extension 44 of the head arm structure 32. The glass scale 42 defines a series of radial microlines which define light-translucent spaces interleaved between the light-opaque radial microlines. A light source 46 and light beam folding mirror 48 provide a source of collimated light energy which is directed through the microline region of the scale 42 toward a photodetector array 50. The photodetector array 50 includes a reticle or mask which is aligned to cooperate with the radial microlines in order to generate and put out electrical phase signals in quadrature, for example. The light source 46, mirror 48 and masked photodetector array 50 are commonly mounted to the base 16 by a mounting arrangement which enables height and rotational adjustment about an optical axis. The cells of the photodetector array and the mask patterns are symmetrically disposed on opposite sides of the optical axis. The scale 42, light source 46, mirror 48 and masked photodetector array 50 provide the optical encoder 41.

As the scale 42 moves relatively to the light source 46, mirror 48 and photodetector array 50, the quadrature phase signals provide repeating amplitude patterns which are used to determine a coarse position for the data head 26 relative to the concentric data tracks of the data surface. E.g. four data tracks or more, may be defined by a single cycle of one of the phase signals. An LED driver circuit 52 controls the light level put out by the light source 46, and a phase comparator 54 converts the optical phase signals into digital boundary signals which mark the boundaries of the data tracks.

In accordance with one aspect of the present invention, a thermistor 56 is mounted to the base 16 in a manner enabling the thermistor 56 to be in thermal conduction with the base 16. Preferably, the thermistor 56 is mounted adjacent to the rotary actuator structure 28 so that it is in position to sense heat generated in the rotor coil 36. Preferably, the thermistor 56 is mounted to a flex circuit conductor which is attached by a screw directly to the base 16, adjacent to the bottom flux return plate of the magnet pair 38.

Fine position servo information is embedded within the data surface of the disk 18. This fine position servo information is prerecorded at the factory by a servowriter mechanism which controls the rotary actuator structure 28 and the head 26 in order to lay down a predetermined servo pattern. A pattern of radially offset, time staggered bursts is presently preferred, and such pattern may be prerecorded in one or more sectors in one or more of the tracks of the disk. Preferably, an outer region 58 of four reference tracks are prerecorded with six circumferentially spaced apart servo sectors (shown in hatching in FIG. 1). A separate reference track is provided for each optical phase put out by the optical encoder photodetector array 50, so that the optical encoder 41 may be calibrated to the disk surface for each one of the four tracks defined by each complete optical cycle. A radially inner region of four reference tracks may also be provided for the same optical phases, so that for each optical phase, an inner reference track and an outer reference track may be read by the head 26 and head position offset correction values thereupon derived and stored.

The data transducer heads 26 are connected to a read/write circuit 60 which also includes a data separator and an encoder/decoder for encoding and decoding a variable length, zero run length limited code. A peak detector amplifier 62 sequentially receives linear peak amplitude values read by the head 26 from the embedded servo sectors on the disk 18.

A microcontroller 64 forms the heart of the electronics 14. The microcontroller 64 operatively controls the spindle motor driver 24, the rotor driver 40, and the LED driver 52. Analog values supplied by the photodetector array 50, the thermistor 56 and the peak detector amplifier 62 are delivered to a multiplexed analog to digital converter within the microcontroller 64. These analog values are converted into digital values under the control of a control program executed by the microcontroller 64. The rotary movements of the rotary actuator structure 28 and the light level put out by the light source 46 are controlled by pulse width modulator outputs of the microcontroller 64.

Other electrical elements of the disk drive electronics 14 include a data separator and memory controller circuit 66, an interface logic circuit 68, a read only memory 70 for containing external portions of the control program (certain time-sensitive portions thereof being contained within an on-board program memory of the microcontroller 64), a random access memory 72, and a cache buffer memory 74. A chip select logic circuit 76 enables the ROM 70 and RAM 72 to be selectively enabled under program control.

A data/low-bit address shared bus 78 interconnects the microcontroller 64, sequencer/controller 66, interface 68, ROM 70, and RAM 72. The sequencer/controller 66 decodes low order address values and provides them to the ROM 70, and RAM 72 over an external address bus 80. High order address values are provided by a bus 82 directly from the microcontroller 64 to the ROM 70, RAM 72 and chip select logic 76. Addresses for the data cached in the cache buffer 74 are generated and put out on a bus 84 from the sequencer/controller 66, and the data is transferred between the interface logic 68, cache 74 and sequencer/controller 66 over a shared bus 86. A bus 88 leads from the interface logic circuit 68 to a host computing system. The bus 88 typically carries address, data and control/status values in a predetermined small computer signalling format, such as SCSI, or AT.

A head position servo loop is formed by the optical encoder, data transducer head 26, read/write circuit 60, peak detector amplifier 62, microcontroller 64, rotor driver circuit 40 and rotary actuator structure 28 and scale 42. The optical encoder 41 including the scale 42 provides coarse position information to the loop, and the data transducer head 26, read/write circuit 60 and peak detector amplifier 62 provide fine position correction information to the loop.

The microcontroller 64 receives the feedback position information from the optical encoder 41 and from the data surface via the data transducer head 26, read/write circuit 60 and peak detector amplifier 62 as well as data storage/retrieval location information from the host computer via the interface logic 68. The microcontroller 64 thereupon converts the data storage/retrieval logical location information into physical location information and commands the servo to cause the rotary actuator structure 28 to move the head 26 to the desired physical track location, typically called a "cylinder" location, whereupon data may be read from or written to the track, under the control of the data sequencer/memory controller circuit 66.

By thermally compensating the servo loop, it can achieve two performance advantages. First, the servo loop can be optimized to achieve a better access time at normal operating temperature without losing critically damped arrival characteristics at a higher operating temperature. Second, the servo loop can operate at as high a temperature as the hardware components can tolerate.

As already noted, the total resistance Rt seen by the rotor power amplifier driver within the circuit 40 is the sum of lead resistance, sense resistor resistance and actuator voice coil resistance. This total resistance is a function of temperature. As the temperature increases, the total resistance Rt increases. Therefore, the acceleration and deceleration time of the actuator structure 28 is clearly a function of temperature.

Since the thermistor temperature measurement is available to the microprocessor 64, it computes the velocity trajectory profile as a function of the thermistor sensed temperature value. Hence, the track seeking servo loop can now adaptively adjust the trajectory profile as a function of temperature.

As already noted, the temperature sensed by the thermistor 56 is presented at an analog to digital port of the microcontroller 64 and converted into a digital value which is stored in a predetermined register location. With the temperature measurement available, the microcontroller 64 then computes the velocity trajectory profile as a function of measured temperature. Hence, the performance of the servo loop may be adaptively adjusted to be optimized as a function of sensed temperature, instead of having to be set to the worst case as previously has been necessary.

Figure 2:
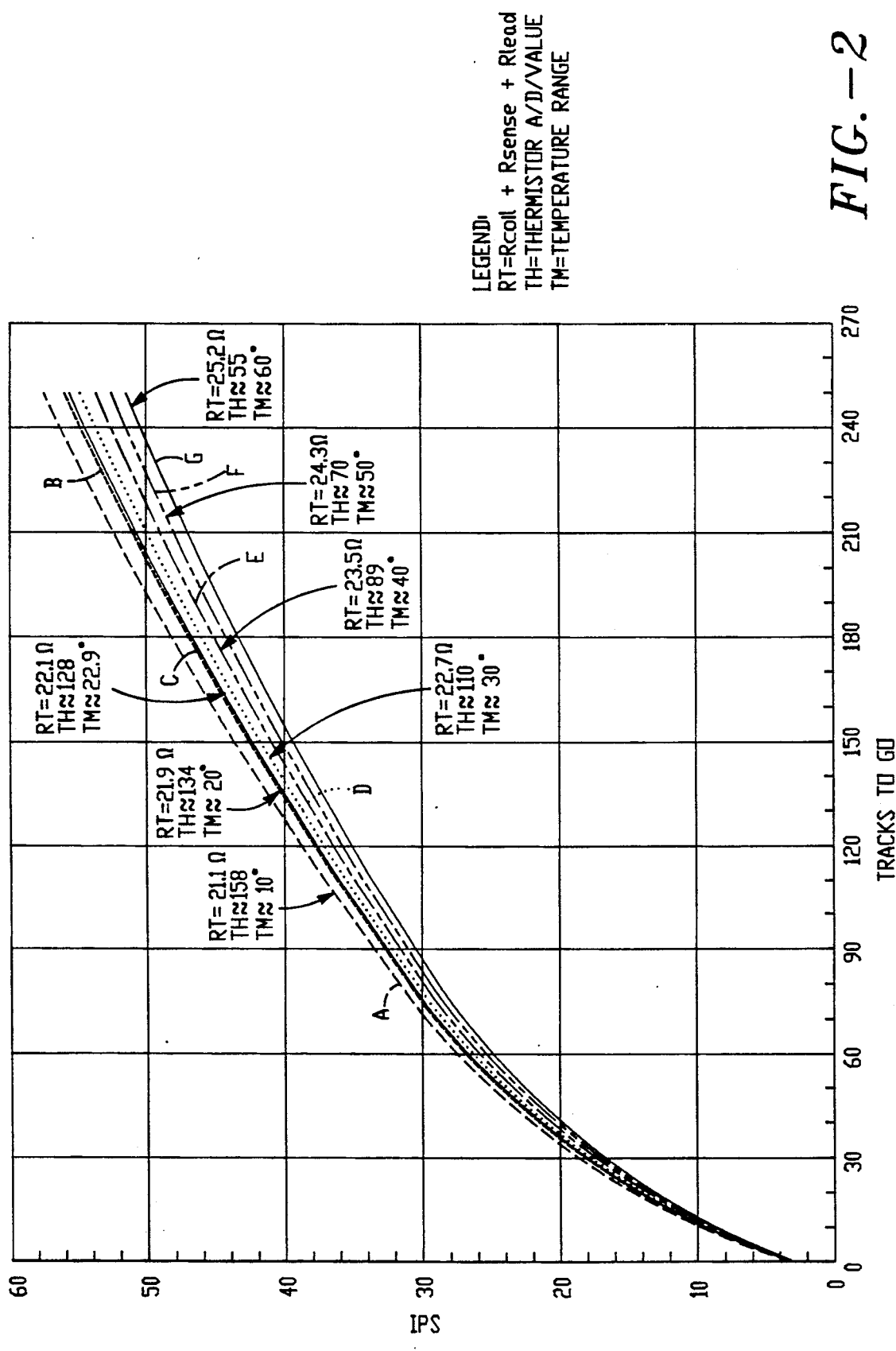
FIG. 2 is a graph of a family of velocity profile curves as a function of sensed temperature.

FIG. 2 presents a velocity profile family of phase plane trajectories of the actuator structure 28 as a function of ambient temperature within the head and disk assembly 12 as sensed by the thermistor 56. Curve A represents actuator response at 10 degrees C. at which the total resistance Rt is 21.1 ohms. Curve B represents actuator response at a sensed temperature of 20 degrees C. At this temperature the total resistance is 21.9 ohms and the response time is slightly less than represented by Curve A. Curve C represents the reference curve and temperature taken at 22.9 degrees C. at which the total resistance is 22.1 ohms and the thermistor is at a midpoint (128) of its total digital quantization range (256). Curve D represents actuator response at 30 degrees C. at which the total resistance is 22.7 ohms. Curve E represents response at 40 degrees C. at which total resistance has increased to 23.5 ohms. Curve F represents the 50 degree C. response with total resistance at 24.3 ohms. Curve G represents response at 60 degrees C. and total resistance at 25.2 ohms. This family of curves illustrates the decline in seek time performance as sensed temperatures increase.

One presently preferred implementation is to take the ratio of the trajectory curve of a different temperature to a reference trajectory curve, such as the curve C of FIG. 2, which is a trajectory at a particular temperature. By inspection of FIG. 2, the ratio is almost constant across the profile. By suitably designing the circuit of the thermistor 56, a nominal value of 128 is fed back at a normal operating temperature (e.g. 22.9 degrees C.). Thus, a suitable reference trajectory is plotted as the curve C of FIG. 2 wherein the thermistor value (TH) is 128. This value is a midpoint value in the digital dynamic quantization range of the A/D input of the microcontroller 64. With this reference curve selected, a ratio is then taken with respect to all of the other curves; and, a family of ratio curves results.

With the family of ratio curves, the microcontroller 64 then derives a multiplication factor VSCALE to scale the reference curve to yield the family of trajectory curves for different temperatures. Since the VSCALE factor is not a direct coefficient from the thermistor value, there is a scaling factor to translate the thermistor value into the VSCALE factor. The following represents the implementation formula for the VSCALE factor:

VSCALE = (1/256) * (256 − (128 − thermistor value)/4.75)

(The 1/256 term is used for implementation scaling purposes).

The actual velocity command is then:

Velocity_command = VSCALE * Reference_Vel_Command

Thus, the velocity command put out to the actuator structure is the product of a reference velocity command (REF_VEL_CMD) times the VSCALE factor. In this manner, the velocity command is thermally adjusted to be optimized for each sensed temperature within the head and disk assembly Returning again to FIG. 2, it is apparent by inspection that at the low temperature end of the thermal operating range of the head and disk assembly, represented by curves A and B, the actuator speed is faster than the speed at the nominal reference temperature. This characteristic is plotted in FIG. 3, which shows that average access time at low temperature is faster than access time at the nominal Curve C operating temperature of 22.9 degrees C.

While improved average access time is always desirable, there are several reasons making it desirable to limit the temperature compensation of the servo loop at low temperatures. First, the disk drive 10 includes in firmware a state model in the seek mode. This model has a precise gain in order to achieve a requisite phase lead for "bang forward-bang reverse" actuator current control switching. Since the acceleration capability of the actuator structure 28 is improved at the lowest temperatures as indicated by Graphs A and B of FIG. 2, the amount of phase lead is reduced. This reduced phase lead will cause undesirable late switching characteristics in the actuator current control switching.

Figure 3:
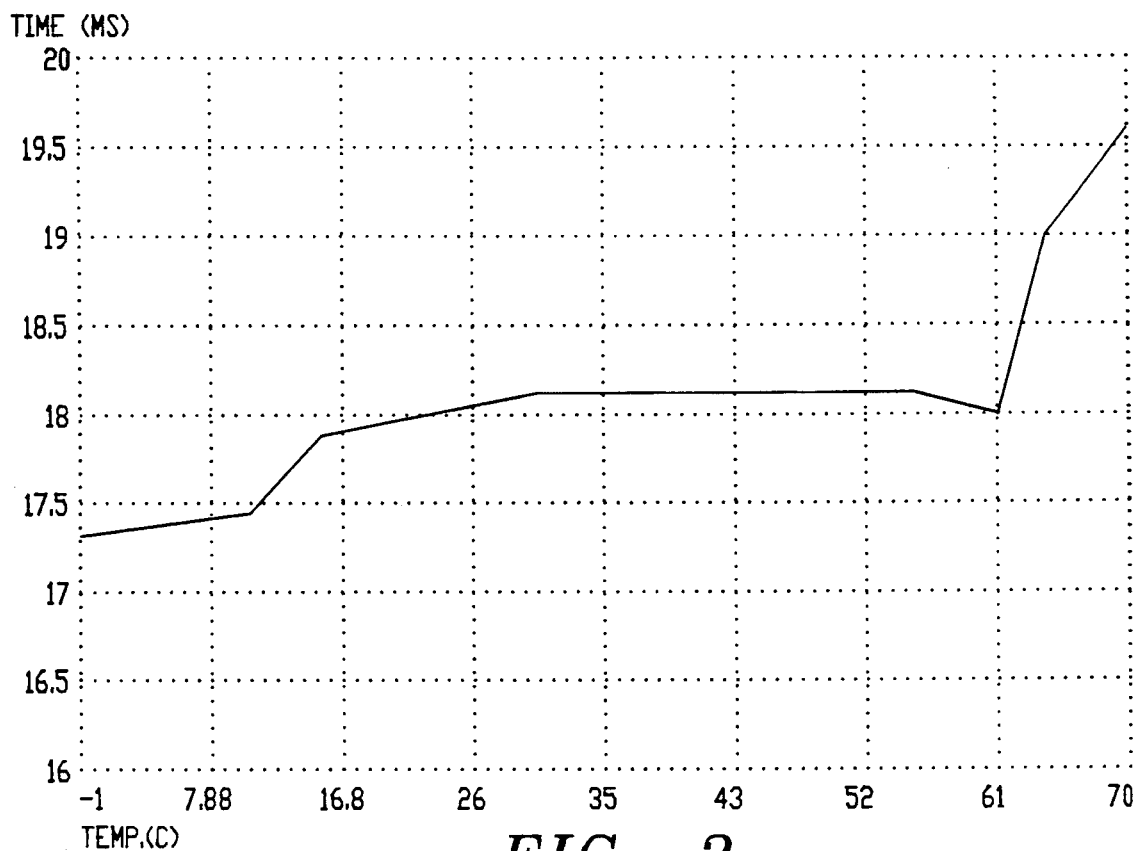
FIG. 3 is a graph of average access time plotted as a function of sensed temperature, with low temperature compensation to optimize at the ambient reference temperature.
Figure 4:
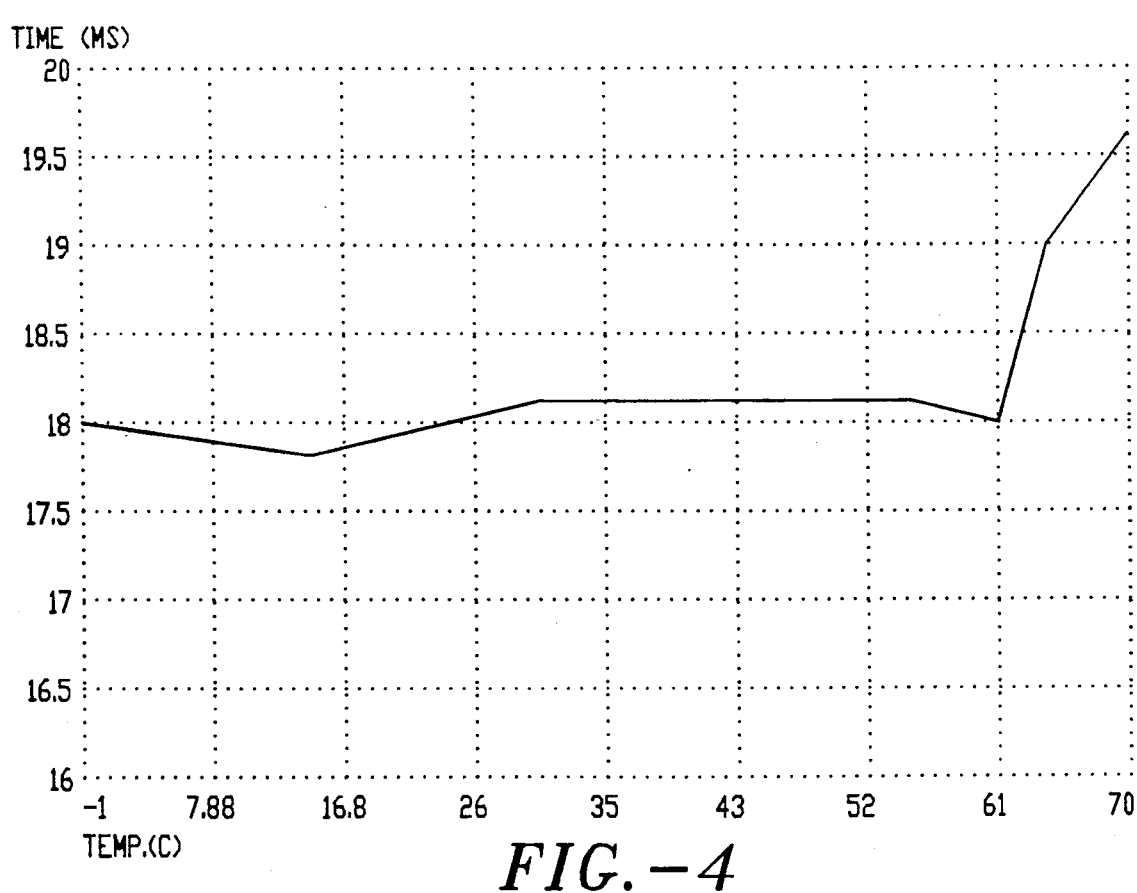
FIG. 4 is a graph of average access time plotted as a function of sensed temperature, without low temperature compensation.

Secondly, the slight non-linearity of the thermistor 56 limits the dynamic range of the compensation temperature, unless further mathematics are performed within the microcontroller 64 to compensate for the non-linearity of the thermistor 56. To simplify calculations and reduce the time/calculation burden of the microcontroller 64, the thermal compensation is optimized for the normal to high temperature range. This compensation is shown in FIG. 3.

Figure 5:
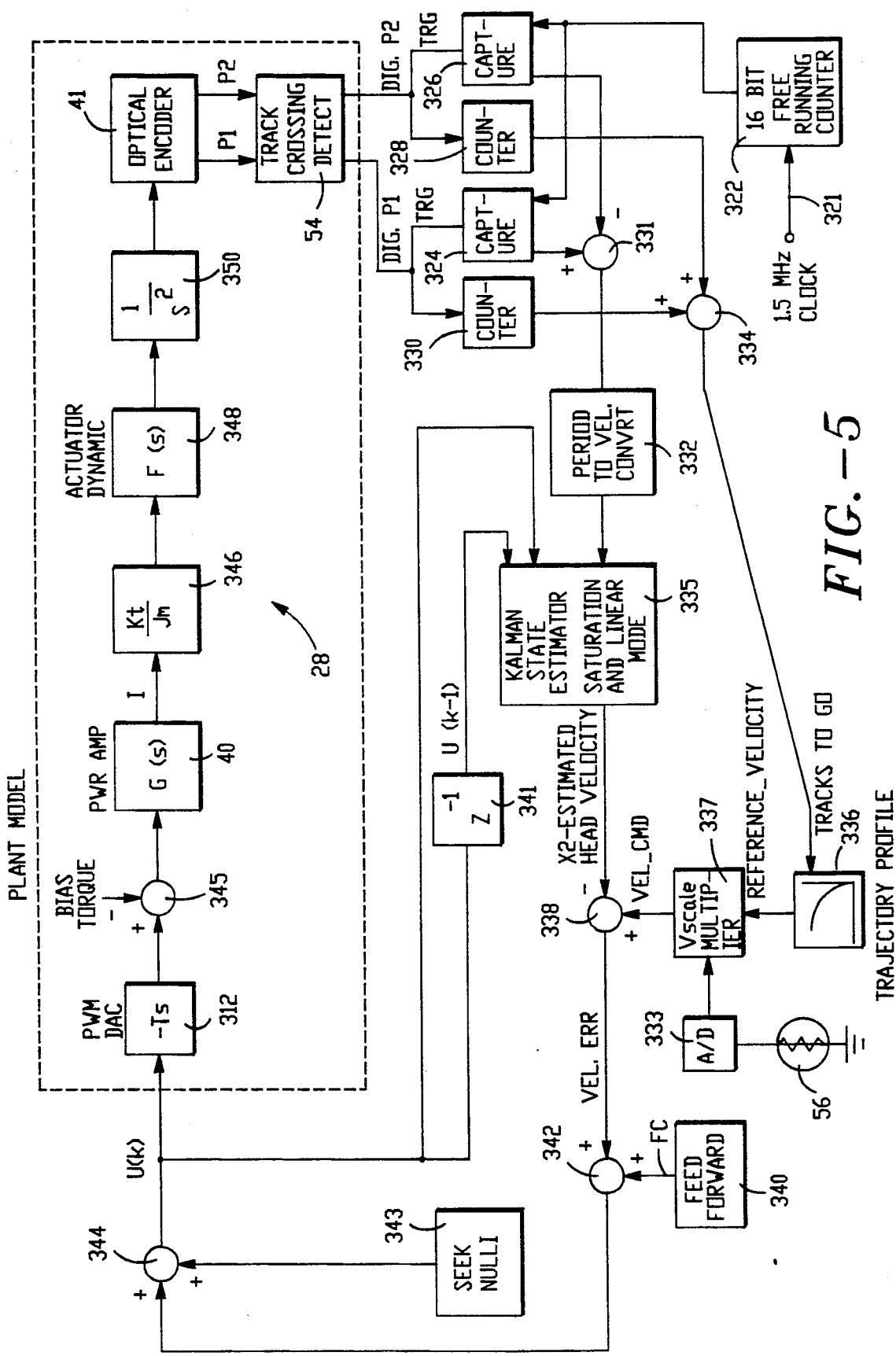
FIG. 5 is a block diagram of an implementation of a velocity servo loop in the FIG. 1 disk drive which includes temperature correction in accordance with the principles of the present invention.

FIG. 5 provides a depiction of the interaction of control firmware executed by the microcontroller 64 with a structural model of the actuator structure 28 (enclosed within the dashed line box labelled "plant model" in FIG. 5) in order to implement a velocity servo loop for track seeking, the servo loop relying primarily upon actuator position information fed back by the optical encoder 41. This description is drawn somewhat from the referenced U.S. Pat. application Ser. No. 07/192,353, filed on May 10, 1988 now U.S. Pat. No. 5,005,089, as further improved and as modified to include the principles of the present invention. For further details, the reader is referred to the incorporated application. This servo loop mode is implemented for all track seeking operations of the disk drive 10 in which the destination cylinder location is in excess of e.g. 22 cylinders away from the departure cylinder location. In this velocity servo loop control mode, a servo service firmware routine is repeatedly executed on an interrupt basis by the microcontroller 64, e.g. at a 120 microsecond sample rate.

When current is applied to the rotor coil 36, the actuator structure 28 moves radially inwardly or radially outwardly, depending upon the polarity of the driving current. As the actuator structure 28 moves one way or the other, the microlines of the glass scale 42 interrupt the light paths of the encoder 41 and result in two generally sinusoidal-like analog phase signals P1 and P2, with the signal P1 leading or lagging the P2 signal by 90 degrees, depending upon the direction of movement of the actuator structure 28 relative to the base 16. When the analog P1 and P2 signals are applied to the phase comparator 54, track crossings are detected, and two digital signals DIG P1 and DIG P2 result. The period of each signal DIG 1 and DIG 2 (rising edge to rising edge, for example) marks two cylinder boundaries.

These digital signals DIG P1 and DIG P2 are respectively applied to decrement two track down counters 330 and 328 within the microcontroller 64 which have been preloaded with a value corresponding to one half the number of cylinders to seek during the particular track seeking operation. This number is based on the fact that the actuator structure 28 has previously been calibrated during a calibration routine, and that the position of each data head is known with respect to a departure cylinder location, since the track ID corresponding to that location has been read and provided via the data sequencer/DMA controller circuit 66.

Thus, if the departure cylinder location is 622 and the seek is to be radially outward to track 400, for example, a value of 111 (one half of the total seek of 222 tracks) is preloaded into the track counters 328 and 330. Once actuator motion begins in the proper direction, the down counters 328 and 330 will decrement on each cycle of the rising and falling edges of the DIG P1 and DIG P2 signals.

A 1.5 megahertz clock 321 provides a sampling rate to a free running sixteen bit up counter 322. Two 16 bit clocked capture latches 324 and 326 capture the real time count of the free running counter at a predetermined sampling rate. On a first track crossing clock edge, a count reached by the free running counter 322 is latched into the latch 324. On the next occurring edge, the count reached by the free running counter 322 is latched into the latch 326. The counts are differenced by a TACH summing junction 331. The difference between the values held in the latches 324 and 326 is a measure of the time elapsed between the last two track crossings and provides a real time 1/velocity feedback signal 1/VEL which is converted to a VEL signal in a period to velocity converter 332. The actual velocity signal VEL put out by the converter 332 is put into a Kalman State Estimator 335. The Kalman State Estimator 335 is implemented by microcontroller program instruction sequences and it provides velocity state information to the servo loop.

In the disk drive 10 there is no coil current feedback sense resistor or sensor. Thus, it is necessary to reconstruct the state of the actuator coil current in order to estimate the velocity state of the actuator. Nonetheless, the power amplifier 40 operates in a voltage mode when the servo is applying saturation control which uses all of the available voltage to accelerate the actuator structure 28. When the servo switches to coast mode or deceleration mode, these modes cause the power amplifier in a linear mode without saturation. Among these two modes the model for the power amplifier is different, and it is necessary to have a saturation model estimator during the acceleration time and a linear model estimator during the coast and deceleration time. One advantage of the Kalman State Estimator 335 is that it takes into account previous states by virtue of a previous state storage and feedback path 341. This provides effective servo loop filtering without loss of high frequency components encountered with more conventional low pass filters. The Kalman State Estimator 335 puts out an estimated head velocity signal to a process node 338.

At the same time that the Kalman State Estimator is estimating actual velocity, outputs from the track counters 328 and 330 are combined in a tracks-to-go summing junction 334 to provide a total of the tracks remaining to be crossed, and the resultant value is applied to address an appropriate trajectory value stored in a trajectory profile look-up table 336 in the external read only memory 70. The result of this look-up operation is a reference velocity value REF_VEL.

In accordance with the principles of the present invention, an analog temperature signal sensed by the thermistor 56 is converted into a digital value by the analog to digital converter 331 within the microcontroller 64. A calculation node 337 then multiplies the digitized thermal value by the reference velocity REF_VEL in order to calculate a thermally corrected velocity command VEL_CMD.

A node 338 subtracts estimated head velocity from the Kalman State Estimator 335 from the thermally corrected velocity command VEL_CMD in order to arrive at a velocity error signal VEL_ERR. If the estimated actual velocity corresponds to the thermally compensated velocity command VEL_CMD, then the VEL_NORM error value put out from the node 338 has a weighted value of 128. This value is at the midpoint of the dynamic quantization range of the pulse width modulator 312 of the microcontroller and represents a null I point.

A feed forward current value FC is calculated by the microcontroller 64 at a process 340 to provide a base current value, depending upon the nature of the seek. The feed forward current value FC is an a priori prediction of current expected to be required to carry out the seek. It is based on information which quantify the operating characteristics, some of which are developed during the initialization calibration routines carried out within the disk drive 10. The feed forward value FC enables a more accurate adherence to the desired seek trajectory for a given velocity servo loop bandwidth. The feed forward current value FC is added to the velocity error signal VEL_ERR at a node 342. A Seek NullI value is computed at a process 343 to offset a constant bias torque 345 which is applied to the actuator structure 28 by virtue of a flex circuit (not shown) providing requisite connection paths to the data transducer head(s) 26 and to the actuator coil 36. The bias torque is shown as being added to the plant model of the actuator at a node 345 following the pulse width modulator. The Seek NullI value is added to the feed forward compensated velocity error signal leaving the node 342 in a further process node 344. The output of the node 344 is fed forward to the pulse width modulator 312, and is fed back to the Kalman State Estimator directly, and through the state delay process 341.

In the FIG. 5 depiction of the plant model, the power amplifier block 40 is symbolized as including a hardware conceptual model which takes into account saturation mode and linear mode. An actuator acceleration factor model 346 divides torque constant (Kt) by actuator inertia (Jm) which when multiplied by current I yields acceleration of the actuator structure. The actuator dynamic characteristics, such as stiffness and resonances, are lumped together at a block 348 in order to model the actuator behavior as closely as possible. The block 350 indicates an integration of force F to yield velocity, and a further integration of velocity to yield position. Position of the actuator structure 28 relative to the base is thereupon directly sensed by the optical encoder 41.

FIG. 6A sets forth a flowchart of firmware executed by the microcontroller 64 during a background operational phase for calculating and recording the VSCALE value. This routine, labelled SEEK_THERM_ADAPT is entered at a node 352. A RESULT is calculated at a node 354 according to the following:

RESULT = 128 − (64 − THERMISTOR_BASE)/4.75.

A logical node 356 then tests RESULT to determine if it is less than or equal to 128. If RESULT is less than or equal to 128, a process node 358 records the VSCALE value as being the same as the RESULT. If RESULT is greater than 128, a node 360 sets VSCALE equal to 128, thereby providing low temperature normalization as graphed in FIG. 3. This background routine is now completed, and a return is made to the background program task list at a node 362.

FIG. 6B depicts a portion of the seek interrupt service routine SEEK_ISR executed by the microcontroller 64 as a foreground servo interrupt routine. In this seek routine 364, one process step 366 is to retrieve VSCALE from a memory register and to calculate VEL_CMD as a product of VSCALE and the reference velocity REF_VEL provided from the trajectory profile lookup table 336. A step 368 then doubles the value of the velocity command VEL_CMD by adding it to itself. This magnitude doubled value is then added at the node 338 to the estimated head velocity from the Kalman State Estimator 335 to provide the seek velocity error value VEL_ERR. SEEK_ISR then continues in accordance with FIG. 5 until completion during the servo service routine interrupt interval portion of program execution by the microcontroller 64.

To those skilled in the art, many changes and widely varying embodiments will be suggested from the foregoing. The disclosures and descriptions herein are presented by way of illustration only, and should not be construed as limiting the present invention, the scope of which being more particularly pointed out and set forth in the following claims.

What is claimed is:

1. A method for providing thermal compensation to a seek mode servo loop of a disk drive having a head and disk assembly including a spindle motor for rotating at least one data storage disk and an electromechanical actuator structure for positioning a data transducer head relative to concentric data tracks defined on a data surface of the data storage disk, the method comprising the steps of:
   sensing temperature of the head and disk assembly dynamically during operation of the disk drive,
   calculating a multiplication factor as a function of sensed temperature,
   multiplying the multiplication factor by a reference velocity command during a track seek operation to provide a velocity command,
   comparing the velocity command with a fed back velocity value to generate a velocity error signal, and
   applying the velocity error signal to an actuator driver to control operation of the actuator structure during the track seek operation.

2. The method set forth in claim 1 comprising the further step of correcting sensed low temperatures by limiting them to be no lower than a nominal reference temperature expected to be sensed at an ambient environment temperature.

3. The method set forth in claim 2 wherein the nominal reference temperature lies in a range between twenty and thirty degrees Centigrade.

4. The method set forth in claim 1 wherein the step of sensing temperature of the head and disk assembly dynamically during operation of the disk drive comprises the step of sensing temperature with a thermistor mounted for thermal conduction directly to the head and disk assembly.

5. The method set forth in claim 1 wherein the step of sensing temperature of the head and disk assembly dynamically during operation of the disk drive comprises the steps of sensing temperature with a thermistor mounted for thermal conduction directly to the head and disk assembly, and converting an analog electrical signal put out from the thermistor into a digital temperature value, and storing the digital temperature value in a memory storage location.

6. The method set forth in claim 5 wherein the step of calculating a multiplication factor as a function of sensed temperature comprises the step of retrieving the digital temperature value from the memory storage location and multiplying the retrieved value by a scaling factor to provide the multiplication factor.

7. The method set forth in claim 6 wherein the dynamic range of the step of converting the electrical signal into a digital temperature value is 256 and wherein the scaling factor equals (1/256) *(256−(128−digital temperature value)/4.75) for a given digitized value to temperature relationship.

8. The method set forth in claim 1 wherein the fed back velocity value is produced by the steps of:
   measuring a period of each track being crossed during the said track seek operation,
   converting said period to a sensed present velocity value,
   generating a predicted velocity value,
   generating an estimated velocity value by reference to the sensed present velocity value and the predicted velocity value, and
   providing the estimated velocity value as the fed back velocity value.

9. The method set forth in claim 8 wherein the step of generating the predicted velocity value is performed recursively with a Kalman State Estimator means.

10. The method set forth in claim 1 wherein the fed back velocity value is derived by the step of measuring incremental actuator position with a polyphase optical encoder having a scale closely coupled to a rotating head arm of the electromechanical actuator structure to provide period, and converting period to a sensed present velocity value.

11. Apparatus for providing thermal compensation to a seek mode servo loop of a disk drive having a head and disk assembly including a spindle motor for rotating at least one data storage disk and an electromechanical actuator structure for positioning a data transducer head relative to concentric data tracks defined on a data surface of the data storage disk, the apparatus comprising: of:
    temperature sensor means for sensing temperature of the head and disk assembly dynamically during operation of the disk drive,
    the seek mode servo loop including processing means having:
        calculating means for calculating a multiplication factor as a function of sensed temperature,
        multiplying means for multiplying the multiplication factor by a reference velocity command during a track seek operation to provide a velocity command,
        feedback velocity value generation means for generating a fed back velocity value,
        comparing means for comparing the velocity command with the fed back velocity value to generate a velocity error signal, and
    actuator driver means for receiving the velocity error signal and for generating driver current to control operation of the actuator structure during the track seek operation.

12. The apparatus set forth in claim 11 wherein the temperature sensor means comprises a thermistor mounted for thermal conduction directly to the head and disk assembly.

13. The apparatus set forth in claim 12 wherein the processing means comprises programmed digital microcontroller means including analog to digital converter means for converting an analog electrical signal put out by the thermistor into a digital temperature value, and storage means for storing the digital temperature value at a predetermined storage location therein.

14. The apparatus set forth in claim 11 wherein the electromechanical actuator structure comprises a mass balanced rotary actuator, and further comprising polyphase optical encoder means having scale means closely coupled to a rotating head arm of the electromechanical actuator structure for measuring incremental actuator position to determine a time period for crossing a data track during a track seeking operation and wherein the processing means includes converting means for converting period to a sensed present velocity value.

15. The apparatus set forth in claim 13 wherein the feedback velocity value generation means includes Kalman State Estimator means for recursively generating the predicted velocity value.

* * * * *